Jan. 10, 1956 C. C. STREET 2,730,569

RECORD SCRAMBLING AND UNSCRAMBLING MEANS FOR SYSTEMS USING MAGNETIC RECORD

Filed Nov. 25, 1949 4 Sheets-Sheet 1

INVENTOR.
CHAUNCEY C. STREET

BY
M. Theodore Simmons
ATTORNEY

Jan. 10, 1956 C. C. STREET 2,730,569

RECORD SCRAMBLING AND UNSCRAMBLING MEANS FOR SYSTEMS USING MAGNETIC RECORD

Filed Nov. 25, 1949 4 Sheets-Sheet 2

INVENTOR.
CHAUNCEY C. STREET

BY

M. Theodore Simmons

ATTORNEY

INVENTOR.
CHAUNCEY C. STREET
BY
W. Theodore Simmons
ATTORNEY

INVENTOR.
CHAUNCEY C. STREET
BY
M. Theodore Simmons
ATTORNEY

United States Patent Office 2,730,569

Patented Jan. 10, 1956

2,730,569

RECORD SCRAMBLING AND UNSCRAMBLING MEANS FOR SYSTEMS USING MAGNETIC RECORD

Chauncey C. Street, Stamford, Conn., assignor to Conger-Groves Corporation, New York, N. Y., a corporation of New York

Application November 25, 1949, Serial No. 129,256

20 Claims. (Cl. 179—100.2)

This invention relates to a magnetic recording and reproducing system employing magnetic tape or wire, particularly arranged to permit recording in a "scrambled" manner so that subsequent reproduction of the recorded material in its intelligible, original form is prevented unless in the reproduction the recording is "unscrambled."

Such systems may be used where it is desired to impose secrecy, as for instance in the transmission of telephone messages, orders, or instructions by radio, the recording of material which is to be kept from unauthorized persons, and under other circumstances where it is desired to produce a recording which will not be intelligible on play-back unless it is "unscrambled" according to the pattern impressed on the record in the "scrambling."

In order to "scramble" the recording, in accordance with this invention, periodic variations in the record speed as it passes the recording head are introduced, according to a predetermined and reproduceable pattern.

In accordance with the illustrated embodiments of the invention, adjustable means are provided for periodically increasing and decreasing the record speed past the recording head, and these means are preferably adjustable, whereby the amount or magnitude, the frequency or periodicity of the speed change, and the phase relation of the changes with respect to each other and to the record are controllable, all according to a predetermined pattern. As will be readily understood, if the recording is made on a record which is thus varied in speed as it passes the recording head, and it be played back at constant speed, the changes in speed of the record in recording will cause a meaningless jumble of sounds to be reproduced on play-back. If, however, in the play-back, the record speed is varied in precisely the same pattern in which the recording was made, and in the proper phase with respect to the record, then, as will be understood, the sound output from the record will come out as it went in.

One of the objects of my invention is to provide a system for recording material with a magnetic recorder, "scrambled" or so distorted in record travel speed in accordance with a predetermined but reproduceable pattern, that it is practically impossible for an intelligible play-back to be made without knowledge of the record speed change pattern used in recording, and reproduction in accord with that pattern.

Another object of this invention is to provide recorder and reproducer mechanisms of the magnetic type in which the record speed may be continuously changed in a predetermined but reproduceable pattern, and in which the amount, frequency and phase relation of the speed change may be preselected and controlled, giving in effect a large number of patterns from which to select, and thereby affording protection against unauthorized unscrambling.

It is a further object of this invention to provide such a system in which the speed variations may be introduced as one, two or more separate components, all of which combine to produce a resultant reproduceable variable speed recording pattern, and each of which may be controlled as to amplitude, frequency, and phase thereby still further increasing the number of possible patterns and affording still further protection against unauthorized unscrambling.

Still other objects and advantages of my invention will be apparent from the specification.

The features of novelty which I believe to be characteristic of my invention are set forth with particularity in the appended claims. My invention itself, however, both as to its fundamental principles and as to its particular embodiments will best be understood by the specification and accompanying drawing, in which, Figure 1 is a diagrammatic view of a recorder, or reproducer, in accordance with my invention;

Figure 1:
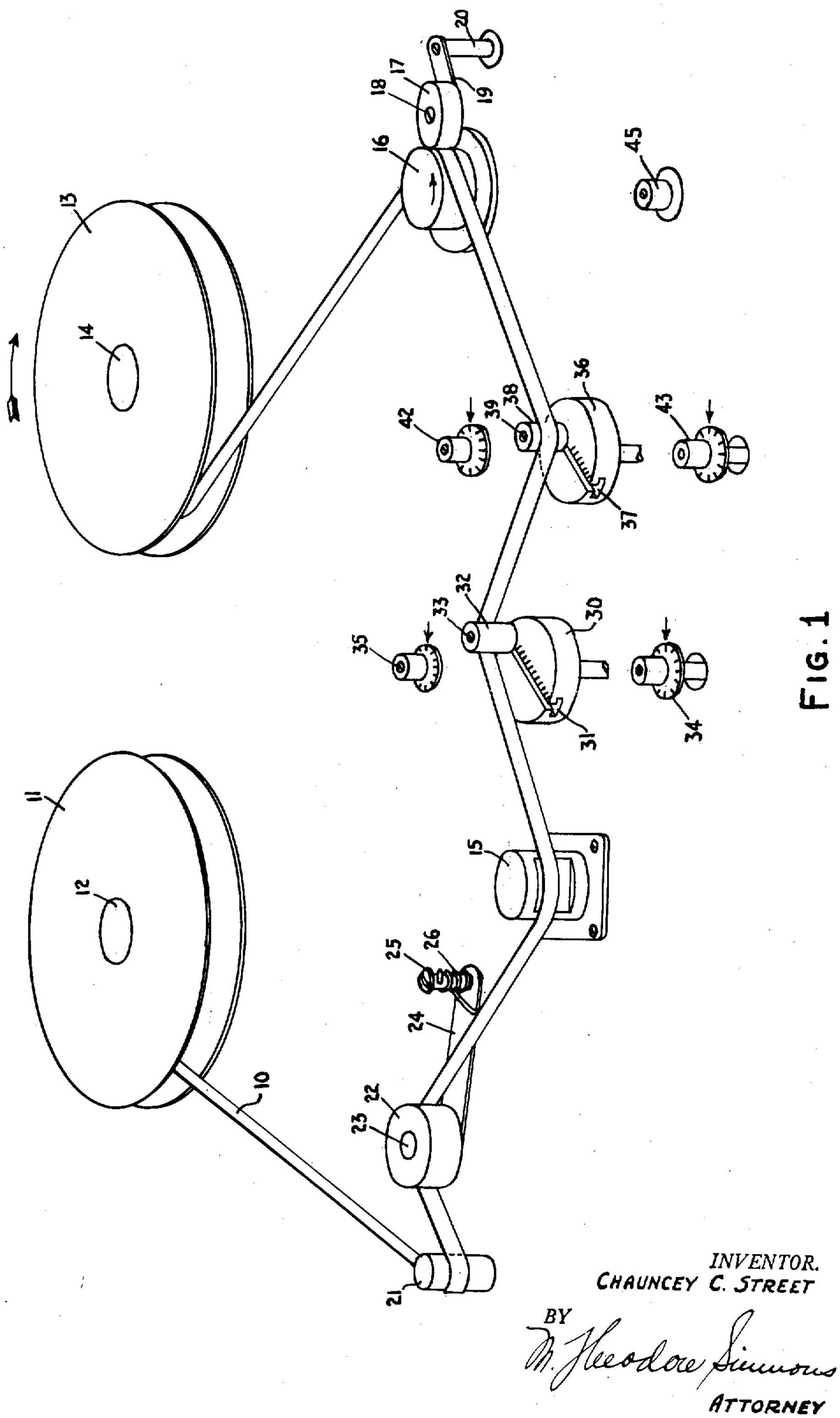

Referring now to Fig. 1, the magnetic record is indicated at 10, and may be any of the well known forms of magnetic recording tape employed in magnetic recorders, or any well known equivalent, such as wire. The record is fed from the feed spool 11, mounted on shaft 12, to the take-up spool 13, mounted on shaft 14, being drawn from the feed spool 11 by any suitable drive mechanism, such as capstan drive 16, around which the record 10 passes, and against which it is pressed by an idler wheel 17 mounted on shaft 18 carried by bracket 19 on pivoted arm 20. The idler wheel 17 is preferably spring-pressed against the capstan 16 by any suitable mechanism, not shown.

During its passage from the feed spool 11 to the take-up spool 13, the record 10 passes the recording and/or reproducing head 15 (herein called "sound head" in accordance with common terminology), which may be of conventional construction and need not be further described, because it is well known in the art. The record is preferably first passed around finger or roller 21 mounted on the chassis, or otherwise, and idler pulley 22, mounted on shaft 23, carried on arm 24, which is pivotally mounted on standard 25, on the chassis, or otherwise, and spring-presses the idler against the record by spring 26. As will be understood, the idler 22 serves to keep the record 10 taut and to prevent slack developing.

In order to introduce variations in the speed of the record as it travels past the sound head 15, I may provide a number of stations or units, here represented by eccentrics or reciprocating elements, which have the effect of periodically increasing and decreasing the record travel speed past the sound head, the basic speed being provided by the constant speed capstan 16. As shown in Figure 1, there are two such reciprocating elements, but more or less may be provided, as desired. The reciprocating element 30 comprises a disc suitably connected to the driving motor through connections to be described later, and has in its upper face a diametric inverted T slot 31. Secured in this T-slot is a shouldered bolt 33, serving as a spindle for a finger or roller 32. The nut of the bolt (not shown) is located in the slot 31 and serves to clamp the bolt, and with it the roller 32, in the desired adjusted position along the slot.

By loosening the bolt 33, the finger or roller 32 may be positioned at any desired point in slot 31, and thereby the amplitude or magnitude of the variations of record speed may be controlled. It will be understood that as disc 30 rotates, the finger or roller 32 will describe a circular path, the radius of which is variable and controllable by the setting of the finger or roller. As the roller 32 moves inwardly (that is toward the top of Fig. 1) the record will be moved inwardly and its speed past the sound head 15 will be increased, whereas when the roller moves outwardly, the record speed will be decreased, the idler 22 serving to keep the record taut at all times. The speed of rotation of disc 30 may be controlled by a speed control knob 35 operating a shaft to control a variable speed transmission, as will be described hereinafter, and the phase of the rotation of disc 30 may be separately varied by a phase adjustment knob 34 connected by a shaft to phase control mechanism, also to be described.

It will be seen that control of finger or roller 32 permits the introduction of one variable speed component controllable as to amplitude, frequency and phase. The second such component may be introduced by a second roller 38 carried on disc 36, and similarly constructed having T-slot 37 within which the roller 38 may be moved and held in position by clamping bolt 39. Speed control knob 42 may be provided to control the speed of disc 36 and phase control knob 43, its phase as in the case of disc 30. As many additional units or stations may be provided as desired, each for introducing a variable component.

The over-all movement of the record is determined by the resultant of the constant speed imparted by the capstan drive 16 and the variable components introduced by each station, or reciprocating element, and it will be understood that this resultant may be made to vary in a highly complex pattern, thus distorting or "scrambling" the recording in a very complex manner. If it is desired to play back the recording, and to "unscramble" it while doing so, it is first necessary that the speed of the record should vary in the same pattern at which the record was made, no matter how complex that pattern may be or how many variables were introduced.

However, one additional step is necessary, and that is that the reproducing pattern must not only be the same as the recording pattern but it must also be in phase, otherwise the reproduction will still be "scrambled." This is obtained, according to the present invention, by the use of a master synchronizing phase control 45, interposed between the driving motor or capstan 16 and all of the eccentrics, and operating in a manner to change the phase of the recording pattern through at least one complete cycle. By adjustment of this master synchronizing control, the pattern of speed increases and decreases are merely shifted in phase as a whole until they occur at the proper points with respect to the record.

It will now be clear that the record may be reproduced in its "unscrambled" form at any time either on the instrument on which it was recorded, or on a different and remotely located instrument, provided the adjustments on the second reproducer are made the same as those used at the time at which the record was made. Because of the large number of variables which may be introduced, it is practically impossible to "unscramble" the record unless the person desiring to hear it is given the list of adjustments which were made when the record was recorded, for which purpose the speed control knobs 35 and 42, and the phase control knobs 34 and 43, may be provided with calibrated discs bearing numbered indicia, while the discs 30 and 36 may be calibrated to facilitate adjustments of the rollers 32 and 38. To reproduce and "unscramble" the record on another machine, the user will place the record in position, adjust the speed and phase control knobs and the eccentric rollers of each unit to the adjustments given, and start the record playing. Unless it should happen purely by chance that the speed variation pattern is in the proper phase relation the reproduction will be a jumble, but operation of the master synchronizing control 45 will bring the pattern into proper phase and the record will now play back "unscrambled."

Figure 2:
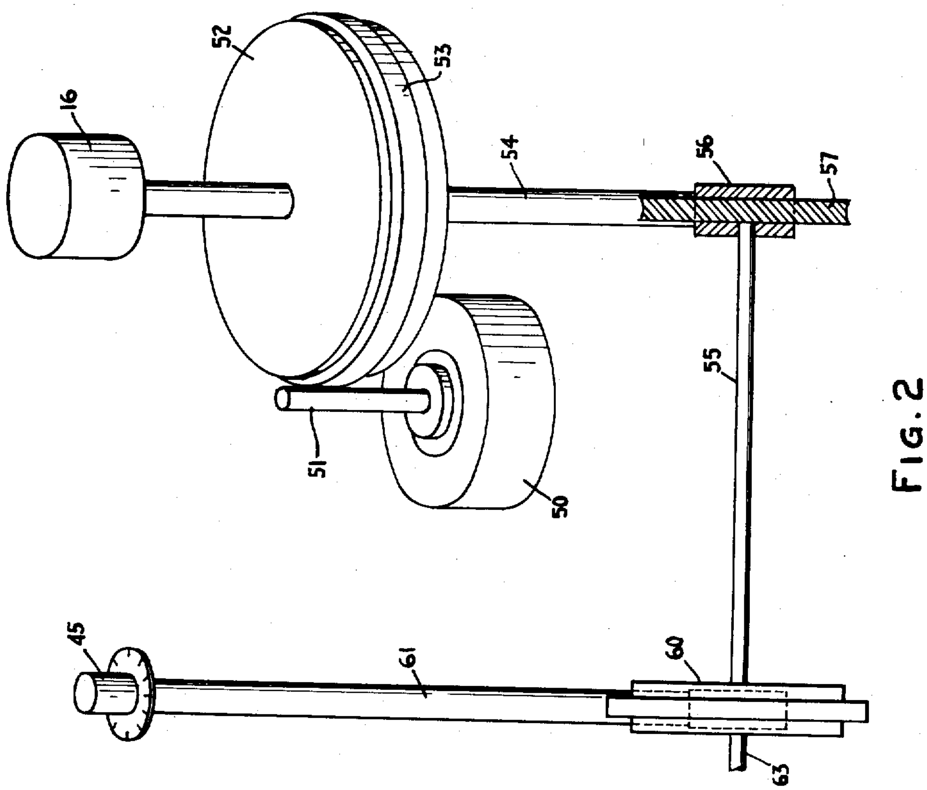
Fig. 2 is a diagrammatic view of the motor drive, and showing also the use of a master synchronizer for varying the overall phase of the resultant speed variation pattern with respect to the record.

Referring now more particularly to Fig. 2, 50 designates diagrammatically any suitable motor for driving the mechanism. The motor may have a shaft 51 engaging the rim 53 (which may be rubber) of wheel 52 mounted on shaft 54, and terminating at its upper end in the capstan 16. The lower end of shaft 54 may carry a worm 56 engaging worm wheel 57 mounted on shaft 55, the other end of which may be connected to a so-called differential or phase adjustment control, operable from knob 45 through shaft 61. A shaft 63, common to all the stations or eccentrics, is connected to the other side of the differential. The construction of such differential or phase adjustment device may be any of the well known forms, and if desired may be that described hereinafter, with reference to Figs. 4 and 5, it being understood that shaft 63 rotates at a constant ratio to the speed of motor shaft 51 but is adjustable in phase, and the various eccentrics being driven from shaft 63, rotation of phase control knob 45 will advance or retard the position of shaft 63 with respect to shaft 55, but will not change the "scrambling" pattern. Thus, there is introduced a master or overall variation of phase which will shift the "scrambling" pattern phase as a whole, with respect to the sound head.

Figure 3:
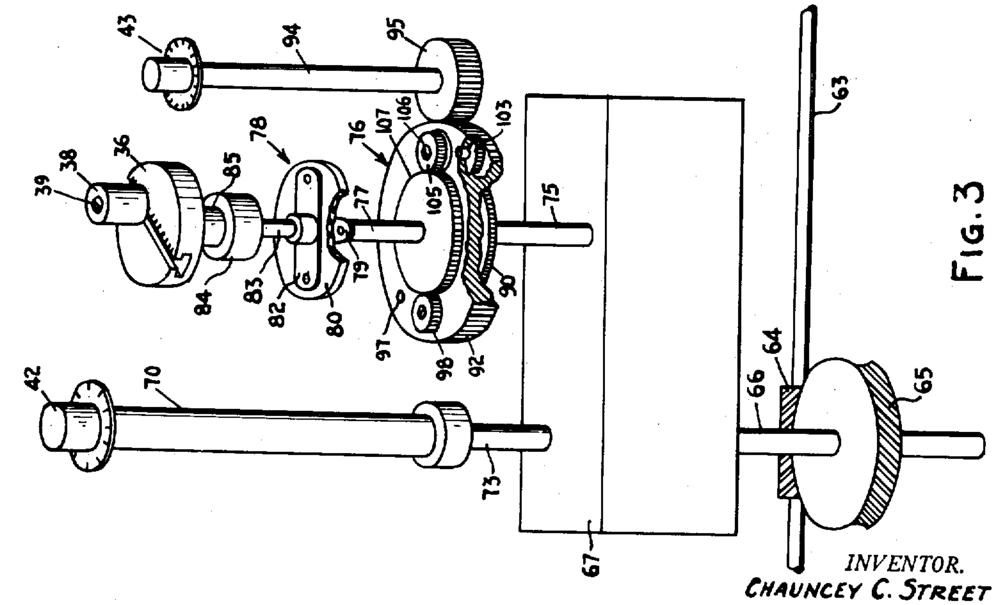
Fig. 3 is a somewhat diagrammatic view of mechanism (parts being broken away) comprising one unit for introducing one component of speed variation and controllable as to amount, frequency and phase.

Referring now more particularly to Fig. 3 in which I have shown mechanism for driving each of the eccentrics, disc 36 carrying roller 38 serving as an example, the shaft 63 may be provided with a worm 64 engaging gear 65 on shaft 66. This latter shaft may drive any suitable speed change transmission, indicated at 67. Such mechanism should provide as many different speeds at the output, for a given speed input, as desired for the variety of combinations to make up the overall pattern, the output speed being selectively controllable by means of control rod 73 extending into the speed change mechanism 67, and terminating at its other end in the speed control knob 42.

Figure 4:
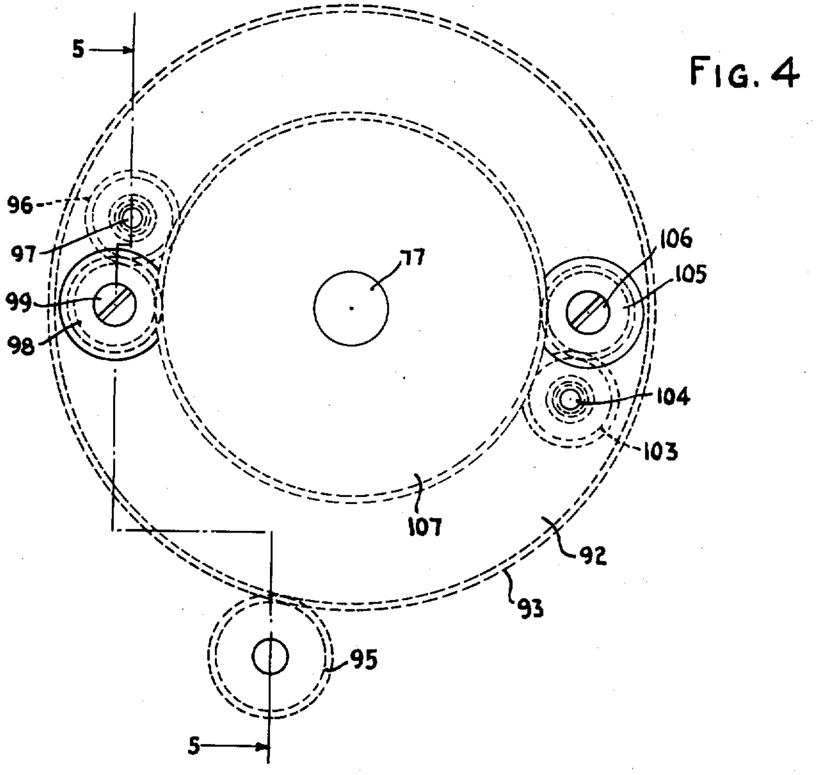
Figs. 4 and 5 are respectively top plan and sectional views of the control mechanism, somewhat in the nature of a differential, used for phase control in the apparatus of Fig. 3.
Figure 5:
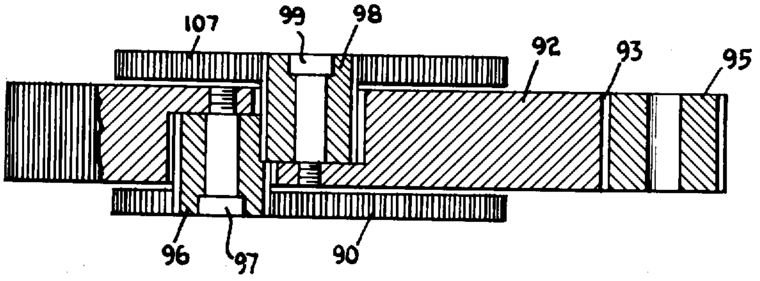

The output shaft 75 of the transmission may drive a differential or phase control mechanism 76, which will be described in detail with reference to Figures 4 and 5, and the output of the differential mechanism 76 is applied to shaft 77. If desired, a vibration dampener 78 may be interposed in this shaft for the purpose of absorbing any undesired vibration which may occur in shaft 77. This dampener may be of any suitable form, but by way of embodiment I have shown arm 79 carried by shaft 77, secured on the underside of damping disc 80, and a second arm 82 secured to the upper side of the damping disc at right angles to arm 79. The disc may be of rubber, leather, or other suitable material. The arm 82 carries shaft 83 on which is mounted the collar 84, and eccentric disc 36 on which the roller 38 is adjustably mounted. Individual phase control of the rotation of disc 36 is accomplished by rotation of knob 43 connected by shaft 94 and gear 95 to the differential 76. In the embodiment thereof, shown in Figs. 4 and 5, I provide a center member 92 having peripheral gear teeth 93 which are engaged by gear 95 on phase control shaft 94. Gear 92 is stationary except when rotated manually by operation of phase control knob 43.

Driving gear 90, mounted on and driven by shaft 75, is located beneath center gear member 92. Driving gear 90 in turn engages idler gears 96 and 103 secured in recesses in center gear 92 by means of axle bolts 97 and 104. The idler gears 96 and 104 respectively engage and drive the meshing gears 98 and 105, similarly mounted in recesses in center gear 92 by means of axle bolts 99 and 106. Gears 98 and 105 project above center gear 92 and engage and drive the top gear 107 which is fastened to shaft 77 (Fig. 3). In the operation, gear 90, driven by shaft 75, will drive gears 96 and 103, these in turn driving gears 98 and 105, which, in turn, drive the gear 107, secured to the shaft 77. If phase control knob 43 is rotated, it will be observed that center gear 92, which ordinarily does not rotate, is now rotated through an angle corresponding to the rotation of gear 95 and is therefore advanced or retarded in phase with respect to gear 90, this in turn retarding or advancing gear 107 and shaft 77 with respect to shaft 75; or, referring to Fig. 2, the shaft 63 is advanced or retarded with respect to shaft 55. Expressed with respect to the record, the operation of phase control knob 43 (Fig. 3) advances or retards the eccentric roller 38 in its orbit, with corresponding effect on the "scrambling" pattern, and operation of phase control knob 45 (Fig. 2) simultaneously advances or retards the common drive for all the individual units and associated eccentrics with respect to the constant speed capstan or the sound head, whichever is considered the reference point.

Figures 6, 7:
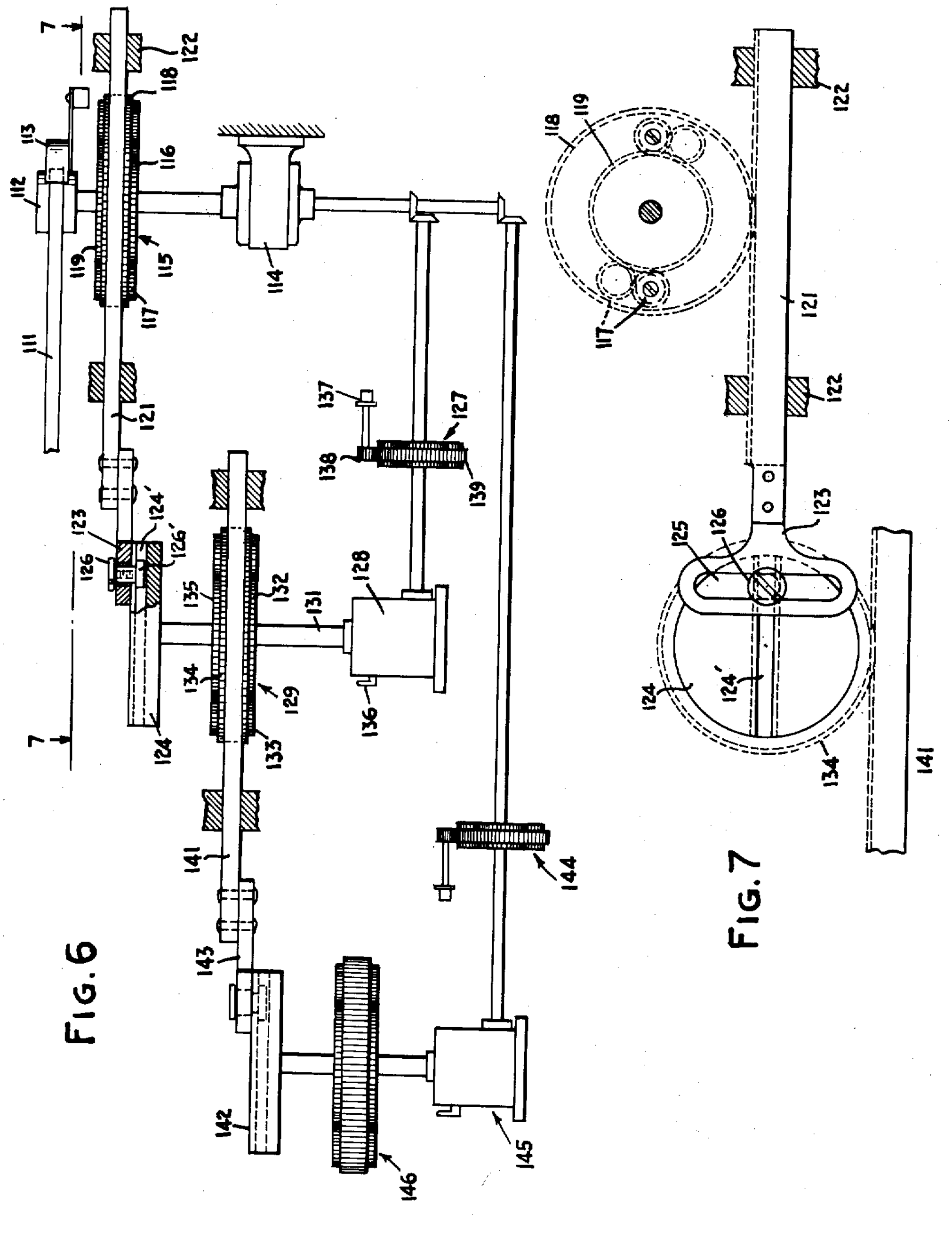
Fig. 6 is a diagrammatic view of a portion of a recorder, or reproducer, illustrating another embodiment of my invention.
Fig. 7 is a fragmentary plan view on the line 7—7 of Fig. 6.

Referring now to Figs. 6 and 7, there is illustrated an alternate method of causing variations of speed of the record past the sound head, again in a repeating reproduceable pattern of speed variation with time. For sake of simplicity, the feeding and take-up reels and the sound head are not illustrated. The record tape 111 is moved past the sound head (not shown) by the capstan 112, the spring pressed idler 113 aiding in the movement of the record. Capstan 112 may be driven from the motor 114, and in this form the drive is through a differential type of mechanism, indicated at 115, and which, for the purposes of illustration, may be similar in construction to that shown in detail in Figs. 4 and 5. Briefly, the motor 114 is connected to gear 116 which, through the pairs of idlers 117 carried by the main gear disc 118, drives the gear 119 on the opposite side of the gear disc 118. There is a direct connection from the gear 119 to the capstan 112. It is evident that, assuming there is no movement of the gear disc 118, there will be a direct and constant speed drive of the capstan 112 from the motor 114.

In order to introduce a component of speed variation in the operation of the capstan 112, according to the present embodiment, I may provide a rack bar 121, desirably guided in bearings 122, which rack is in engagement with the teeth on the periphery of the main gear disc 118. Rack bar 121 is connected by the T-shaped link 123 to a reciprocating disc 124, the link 123 having a slot 125 in its head in which is engaged reciprocating pin 126. Pin 126 may be movably and removably mounted in the reciprocating disc 124 by means of a nut 126′ which is slidably mounted in transverse T-slot 124′ in disc 124. The link 123 is suitably bolted or otherwise secured to the rack bar 121 so that as the disc 124 rotates, the reciprocating pin and link connection to the rack bar will produce an harmonic motion of the rack bar and of the main gear 118 of the differential mechanism 115. Since this is entirely a reciprocating motion of the main gear, the idler gears 117 will be alternately advanced and retarded from their normal positions to thereby produce an acceleration and deceleration in the speed of rotation of the capstan 112. (The purpose of the removable pin 126 is to enable the disconnection of the drive to the rack bar 121 so that the capstan 112 may be rotated directly from the motor 114 at a constant speed and without being affected by the differential 115. The illustration is merely symbolical.)

The drive for the reciprocating disc 124 is illustrated as from the motor 114 through a phase control differential 127, a suitable speed changer mechanism 128 and a second differential mechanism 129, which latter may be similar in construction and function to that of the differential mechanism 115 just described. In other words, the output shaft 131 from the speed changer 128 may be connected to the gear 132 and through idler gears 133 carried by main gear disc 134 the drive is communicated to the gear 135 which is directly connected to the reciprocating disc 124. It is intended that the speed changer shall have a multiplicity of speeds respectively selectable by the handle 136 with which suitable indicating indicia is associated so that the knowledge of the particular speed may be communicated to remote stations at which it may be desired to reproduce the pattern used at the time of the "scrambling" of the message on the tape 111. In this manner, the speed of the disc 124 will determine the periodicity of the harmonic motion ultimately produced by the rack bar 121. The phase control differential may also be similar to the mechanism illustrated in Figs. 4 and 5 and by turning the knob 137, pinion 138 will rotate the main gear disc 139 to adjust the phase relationship between the capstan drive and the mechanism superimposing the harmonic thereupon.

A second, or additional harmonics may be introduced into the speed of operation of the capstan 112 by the addition of one or more stations similar to that described for imposing an harmonic motion through the medium of the rack bar 121. As illustrating this, the gear disc 134 is adapted to be engaged by a rack bar 141 eccentrically driven from the disc 142 through the link 143, all similarly to that heretofore described in connection with the rack 121, disc 124 and link 123. The disc 142 may also be driven from the motor 114 through a phase control differential mechanism 144, a speed changer mechanism 145 and a further differential mechanism 146, all similarly to that described in connection with the preceding station for producing an harmonic motion. It will be understood that the main gear disc 142 of the differential mechanism may be operated from another rack bar, ad infinitum.

In the claims I have used the term "magnetic recorder" to include the reproducer, it being well understood that the sound head is capable of both recording and reproducing from the record.

In the specification, I have explained the principles of my invention and the best modes in which I have contemplated applying those principles, so as to distinguish my invention from other inventions; and I have particularly pointed out and distinctly claimed the part, improvement or combination which I claim as my invention or discovery.

While I have shown and described certain preferred embodiments of my invention, it will be understood that modifications and changes may be made without departing from the spirit and scope thereof, as will be clear to those skilled in the art.

I claim:

1. A magnetic recorder comprising a driving mechanism for moving a record at substantially a constant speed past a sound head, at least one reciprocating element positioned between said sound head and said constant speed drive, said element being adapted continually and periodically to increase and decrease the record transit past said sound head, said element being operatively coupled to said constant speed drive.

2. A magnetic recorder according to claim 1, wherein said element comprises a shaft and a finger connected to said shaft at a distance from the axial center of said shaft, said finger being adapted to engage and move said record.

3. A magnetic recorder according to claim 2, wherein said shaft is positioned at a distance from the line between the sound head and said constant speed drive whereby the motion of said finger continually and periodically increases and decreases the speed of the record transit past the sound head.

4. A magnetic recorder according to claim 3, wherein said finger is adjustable in its distance from the axial center of its shaft to vary the amplitude of speed variation of the record transit.

5. A magnetic recorder comprising a driving mechanism for moving a record at substantially a constant speed past a sound head, at least one reciprocating element positioned between said sound head and said constant speed drive, said element being adapted continually and periodically to increase and decrease the record transit past said sound head, said element being operatively coupled to said constant speed drive, and a speed change transmission connected between said element and said constant speed drive, and a speed change control connected to said speed change transmission adapted to vary the operation of said transmission to produce a variation in the operation of said element.

6. A magnetic recorder according to claim 5, and further comprising a phase control mechanism connected to said element, said phase control mechanism being adapted to vary the phase of operation of said element relative to the output speed of said speed change transmission.

7. A magnetic recorder comprising a driving mechanism for moving a record at substantially a constant speed past a sound head, a plurality of reciprocating elements positioned between said sound head and said constant speed drive, said elements being adapted continually and periodically to increase and decrease the record speed past said sound head, said elements each comprising a shaft and a member connected to and rotated by said shaft, said member being adapted to engage and move said record from its otherwise normal path from the sound head to the constant drive element, a speed change transmission connected between each of said shafts and said constant speed drive, and a master synchronizing phase control connected between each of said shafts and adapted to synchronize the rotation of said shafts in accordance with a desired recording pattern.

8. A magnetic recorder comprising a driving mechanism for moving a record continually past a sound head, a plurality of record speed-varying elements, each element being arranged to introduce continual and periodic variations of speed of said record past said sound head, said elements each comprising a shaft coupled to and driven by said driving mechanism, a reciprocating member on said shaft axially displaced therefrom, said member adapted continually to engage said record in its traverse, and continually producing a variation in the speed of said record past said sound head.

9. A magnetic recorder according to claim 8, wherein the degree of eccentricity of said member head is adjustable in order to predetermine the desired amplitude of variation in the speed of said record past said sound head.

10. A magnetic recorder according to claim 9, and further comprising a speed change transmission coupled between said driving mechanism and each of said shafts, said transmission being adjustable to vary the frequency of speed change given to the record.

11. A magnetic recorder according to claim 10, and further comprising a differential mechanism connected to each shaft, and a control connected to said differential mechanism for controlling the phase relationship between said driving element and said shaft.

12. A magnetic recorder comprising a driving mechanism for moving a record continually past a sound head, said driving element mechanism operating at constant speed, a plurality of speed varying elements coupled to said driving element, said speed varying elements being arranged to engage said record and continually to impart to said record as it passes said sound head a component of periodic speed variations in a reproducible pattern said speed varying elements each comprising a rotatable shaft connected to and rotated by said driving mechanism, a reciprocating member on each shaft adapted to engage said record in its traverse, the combined motions of said members acting on said record to vary the speed of said record continually past said sound head.

13. A magnetic recorder comprising constant speed means for driving a record past a sound head, and means connected to said driving means for continually varying the speed of traverse of said record past said sound head, said second means comprising a rotatable reciprocating member engaging said record to continually and periodically accelerate and decelerate the traverse of said record past said sound head.

14. A magnetic recorder according to claim 13, wherein said speed varying element is positioned between said driving element and said sound head.

15. A magnetic recorder comprising means for continually driving a record past a sound head, and a plurality of means connected to said drive means for continually varying the speed of traverse of said record past said sound head, said second means comprising rotatable reciprocating members engaging said record to continually and periodically accelerate and decelerate the traverse of said record past said sound head.

16. In a magnetic recorder, in combination, a driving element for moving a record continually past a sound head, and a plurality of reciprocating record speed-varying elements connected to said driving element, each arranged to introduce continual periodic variations of speed of said record past said sound head, whereby the resultant speed of said record past said sound head is a repeating reproduceable pattern of speed variation with time.

17. In a magnetic recorder, in combination, a feed spool and a take-up spool adapted to carry a magnetic record, a sound head past which said record is to be moved, a driving element engaging said record between said sound head and said take-up spool for continually imparting a substantially constant speed of travel to said record, and a pair of elements engaging said record between said sound head and said driving element for continually imparting to said record periodic and reproduceable speed variations.

18. In a magnetic recorder, in combination, a driving element operating to move a record continually past a sound head, driving mechanism for said driving element and including a differential mechanism, a speed varying element connected to said differential mechanism including mechanism for continually and periodically operating said differential mechanism so as to vary the speed of said driving element and with it the speed of said record past said sound head.

19. A magnetic recorder according to claim 18, in which the mechanism for periodically operating the differential mechanism includes a device for varying the speed of the speed-varying element, and mechanism for controlling the phase relationship between said driving element and said speed-varying element.

20. A magnetic recorder comprising a sound head, a record, means for driving said record continually across a space past said sound head located in said space, second means operative continually to move said record in a continually deviating direction in said space head to continually and periodically vary the record speed past said sound head.

References Cited in the file of this patent

UNITED STATES PATENTS

| | | |
|---|---|---|
| 1,093,984 | Flint | Apr. 21, 1914 |
| 1,262,594 | Akimoff | Apr. 9, 1918 |
| 1,325,574 | Nichols | Dec. 23, 1919 |
| 1,499,521 | Hagemann | July 1, 1924 |
| 1,624,596 | Hartley | Apr. 12, 1927 |
| 2,006,961 | Moore | July 2, 1935 |
| 2,045,624 | Walker | June 30, 1936 |
| 2,115,803 | Dudly | May 3, 1938 |
| 2,248,790 | Stapelfeldt | July 8, 1941 |
| 2,281,405 | Barrish | Apr. 28, 1942 |
| 2,286,072 | Dudly | June 9, 1942 |
| 2,373,560 | Hannert | Apr. 10, 1945 |
| 2,401,889 | Smith | June 11, 1946 |